(12) United States Patent
Nielson et al.

(10) Patent No.: US 10,488,239 B2
(45) Date of Patent: Nov. 26, 2019

(54) APPARATUS FOR REDUCING BRAZE JOINT STRESS IN A VIBRATING FLOWMETER

(71) Applicant: Micro Motion, Inc., Boulder, CO (US)

(72) Inventors: Jeffrey D. Nielson, Longmont, CO (US); Gregory Treat Lanham, Longmont, CO (US); Christopher A. Werbach, Longmont, CO (US); Nikhil Bhargava, Indore (IN); Anand Vidhate, Pune (IN); David Fleming, Golden, CO (US); Lyle Dee Ashby, Longmont, CO (US)

(73) Assignee: Micro Motion, Inc., Boulder, CO (US)

( * ) Notice: Subject to any disclaimer, the term of this patent is extended or adjusted under 35 U.S.C. 154(b) by 0 days.

(21) Appl. No.: 16/420,998

(22) Filed: May 23, 2019

(65) Prior Publication Data
US 2019/0277681 A1 Sep. 12, 2019

Related U.S. Application Data

(62) Division of application No. 15/555,661, filed as application No. PCT/US2015/022364 on Mar. 25, 2015.

(51) Int. Cl.
*G01F 1/84* (2006.01)
*G01F 15/18* (2006.01)

(52) U.S. Cl.
CPC .......... *G01F 1/8404* (2013.01); *G01F 1/8409* (2013.01); *G01F 1/8413* (2013.01);
(Continued)

(58) Field of Classification Search
CPC combination set(s) only.
See application file for complete search history.

(56) References Cited

U.S. PATENT DOCUMENTS

| 4,825,705 A * | 5/1989 | Hohloch | G01F 1/8404 73/861.355 |
| 4,891,991 A * | 1/1990 | Mattar | G01F 1/8413 73/861.355 |

(Continued)

FOREIGN PATENT DOCUMENTS

| EP | 1020712 A1 | 7/2000 |
| JP | 08193864 A | 7/1996 |

(Continued)

*Primary Examiner* — Jewel V Dowtin
(74) *Attorney, Agent, or Firm* — The Ollila Law Group LLC

(57) ABSTRACT

A sensor assembly (10) for a flowmeter is provided. A flow tube (20) having a first and second loop (24, 26) are connected by a crossover section (22). The flow tube (20) comprises a thermal expansion bend (300, 302). First and second anchor blocks (30a, 30b) are each attachable to the flow tube (20) proximate the crossover section (22). A tube support (106) is attachable to one of the first and second anchor blocks (30a, 30b). First and second manifolds (90, 92) are attachable to an inlet (50) and outlet (52). A support block (100) is attachable to the first and second anchor blocks (30a, 30b), first and second manifolds (90, 92), flow tube (20), first and second anchor blocks (30a, 30b), and first and second manifolds (90, 92), and allow a predetermined degree of movement due to heating and cooling cycles when not attached to the support block (100).

20 Claims, 16 Drawing Sheets

(52) U.S. Cl.
CPC .......... *G01F 1/8481* (2013.01); *G01F 1/8486* (2013.01); *G01F 15/185* (2013.01)

(56) References Cited

U.S. PATENT DOCUMENTS

| | | | | |
|---|---|---|---|---|
| 5,355,737 A | * | 10/1994 | Lew | G01F 1/8413 |
| | | | | 73/861.355 |
| 5,425,277 A | * | 6/1995 | Lew | G01F 1/8413 |
| | | | | 73/861.355 |
| 5,996,225 A | * | 12/1999 | Ollila | G01F 1/8404 |
| | | | | 29/888.09 |
| 2003/0097882 A1 | * | 5/2003 | Schlosser | G01F 1/8404 |
| | | | | 73/861.355 |
| 2013/0042700 A1 | | 2/2013 | Wang | |
| 2018/0045546 A1 | * | 2/2018 | Nielson | G01F 1/8404 |

FOREIGN PATENT DOCUMENTS

| | | | |
|---|---|---|---|
| JP | 2005106573 A | 4/2005 | |
| WO | 8806517 A1 | 11/1988 | |
| WO | 9840702 A1 | 9/1998 | |
| WO | 2013177540 A1 | 11/2013 | |
| WO | 2014046643 A1 | 3/2014 | |

\* cited by examiner

APPARATUS FOR REDUCING BRAZE JOINT STRESS IN A VIBRATING FLOWMETER

CROSS-REFERENCE TO RELATED APPLICATIONS

This patent application is a Divisional Application of and claims the benefit of U.S. patent application Ser. No. 15/555,661, filed on Sep. 5, 2017, entitled "APPARATUS AND METHOD FOR REDUCING BRAZE JOINT STRESS IN A VIBRATING FLOWMETER," which is the National Stage entry of International Application No. PCT/US2015/022364, with an international filing date of Mar. 25, 2015, entitled "APPARATUS AND METHOD FOR REDUCING BRAZE JOINT STRESS IN A VIBRATING FLOWMETER," and the contents of both applications are hereby incorporated by reference in their entirety.

TECHNICAL FIELD

The present invention relates to flowmeters, and more particularly to a method and apparatus for reducing stress inherent in the heating and cooling cycle associated with brazing of flowmeter elements.

BACKGROUND OF THE INVENTION

Vibrating sensors, such as for example, vibrating densitometers and Coriolis flowmeters are generally known, and are used to measure mass flow and other information for materials flowing through a conduit in the flowmeter. Exemplary Coriolis flowmeters are disclosed in U.S. Pat. Nos. 4,109,524, 4,491,025, and Re. 31,450, all to J. E. Smith et al. These flowmeters have one or more conduits of a straight or curved configuration. Each conduit configuration in a Coriolis mass flowmeter, for example, has a set of natural vibration modes, which may be of simple bending, torsional, or coupled type. Each conduit can be driven to oscillate at a preferred mode.

Material flows into the flowmeter from a connected pipeline on the inlet side of the flowmeter, is directed through the conduit(s), and exits the flowmeter through the outlet side of the flowmeter. The natural vibration modes of the vibrating system are defined in part by the combined mass of the conduits and the material flowing within the conduits.

When there is no flow through the flowmeter, a driving force applied to the conduit(s) causes all points along the conduit(s) to oscillate with identical phase or a small "zero offset", which is a time delay measured at zero flow. As material begins to flow through the flowmeter, Coriolis forces cause each point along the conduit(s) to have a different phase. For example, the phase at the inlet end of the flowmeter lags the phase at the centralized driver position, while the phase at the outlet leads the phase at the centralized driver position. Pickoffs on the conduit(s) produce sinusoidal signals representative of the motion of the conduit(s). Signals output from the pickoffs are processed to determine the time delay between the pickoffs. The time delay between the two or more pickoffs is proportional to the mass flow rate of material flowing through the conduit(s).

Material flow through a flow tube creates only a slight phase difference on the order of several degrees between the inlet and outlet ends of an oscillating flow tube. When expressed in terms of a time difference measurement, the phase difference induced by material flow is on the order of tens of microseconds down to nanoseconds. Typically, a commercial flow rate measurement should have an error of less than 0.1%. Therefore, a Coriolis flowmeter must be uniquely designed to accurately measure these slight phase differences.

It is a particular problem to measure minimal flow rates of materials flowing through a pipeline. It is, however, also known to use a single loop, serial path flow tube to measure relatively low rates of fluid flowing through a pipeline. A flowmeter measuring small flow rates must be formed of relatively small components including tubes and manifolds. These relatively small components present a variety of challenges in the manufacturing process including, but not limited to, difficult welding or brazing processes. First, it is difficult to weld thin-walled tubing. Second, the welds and joints generally do not provide the smooth surface needed for sanitary applications of the flowmeter, as such applications demand a continuous, smooth flow tube surface that does not promote adhesion of material to the walls of the flow tube.

In order to employ a continuous tube surface suitable for low flow rates, a dual loop, single tube sensor may be employed, wherein the flow tube is brazed to an anchor block that supports the flow tube within the flowmeter. As part of the assembly process, the flow tube is completely restrained by being brazed to the anchor block. Unfortunately, as the flow tube and anchor block cool, they do so at different rates, which causes large stresses at the tube-to-anchor braze joints, which can lead to cracks at the braze joints. In dual tube sensors, the set of flow tubes may freely expand and contract as part of the brazing temperature cycle, thereby reducing the residual stress developed in the braze joint.

Therefore, there is a need in the art for an apparatus and method to allow the brazing of anchor blocks to a multi-loop, single flow tube sensor that may accommodate expansion/contraction cycles from heating. The present invention overcomes this and other problems, and an advance in the art is achieved.

SUMMARY OF THE INVENTION

A sensor assembly for a flowmeter is provided according to an embodiment. The embodiment comprises: a flow tube configured to comprise a first loop and a second loop connected by a crossover section, wherein the flow tube comprises at least one thermal expansion bend; a first anchor block and a second anchor block that are each attachable to the flowtube proximate the crossover section; at least one tube support attachable to at least one of the first anchor block and the second anchor block; a first manifold and a second manifold that are attachable to an inlet and an outlet of the flow tube, respectively; a support block attachable to the first anchor block, second anchor block, first manifold, and second manifold; and wherein the flow tube, first anchor block, second anchor block, first manifold, and second manifold are configured to allow a predetermined degree of movement due to heating and cooling cycles when not attached to the support block.

ASPECTS

According to an aspect, a sensor assembly for a flowmeter is provided. The flowmeter comprises:

a flow tube configured to comprise a first loop and a second loop connected by a crossover section, wherein the flow tube comprises at least one thermal expansion bend;

a first anchor block and a second anchor block that are each attachable to the flowtube proximate the crossover section;

at least one tube support attachable to at least one of the first anchor block and the second anchor block;

a first manifold and a second manifold that are attachable to an inlet and an outlet of the flow tube, respectively;

a support block attachable to the first anchor block, second anchor block, first manifold, and second manifold; and wherein the flow tube, first anchor block, second anchor block, first manifold, and second manifold are configured to allow a predetermined degree of movement due to heating and cooling cycles when not attached to the support block.

Preferably, the first anchor block and the second anchor block are brazed to the flow tube; and the first manifold and the second manifold are at least one of welded and brazed to the flow tube.

Preferably, at least one boss defined by each of the first anchor block and the second anchor block; and at least one aperture defined by the support block having a size and dimension to engage the at least one boss.

Preferably, at least one aperture defined by each of the first anchor block and the second anchor block; and at least one boss defined by the support block having a size and dimension to engage the at least one aperture.

Preferably, the first manifold comprises a first support block portion and the second manifold comprises a second support block portion, wherein the first and second support block portions are attachable to each other to form a support block.

Preferably, the first and second support block portions are welded to each other.

Preferably, at least one boss defined by each of the first anchor block and the second anchor block; and at least one mating aperture defined by the support block having a size and dimension to engage the at least one boss, wherein the size and dimension of the at least one boss is keyed to the at least one aperture.

Preferably, the at least one boss is fully insertable into the at least one aperture in only a single orientation.

Preferably, the at least one boss comprises an elongated round shape.

Preferably, at least one boss defined by each of the first manifold and the second manifold; and at least one mating aperture defined by the support block having a size and dimension to engage the at least one boss, wherein the size and dimension of the at least one boss is keyed to the at least one aperture.

Preferably, the at least one boss is fully insertable into the at least one aperture in only a single orientation.

Preferably, the at least one boss comprises an elongated round shape.

Preferably, the flow tube comprises a single-tube, dual loop flow tube, wherein an inlet bend thereon is coplanar with a first flow tube loop and an outlet bend thereon is coplanar with a second flow tube loop, and wherein the sensor assembly comprises a channel in the tube support that sweeps along a path in only a single plane, and wherein the flow tube is a size and dimension to engage the channel in the tube support.

Preferably, the flow tube comprises a single-tube, dual loop flow tube, wherein the crossover section comprises a first portion proximate an outlet bend, the first portion being coplanar with a first flow tube loop, and wherein the crossover section comprises a second portion proximate an inlet bend, the second portion being coplanar with a second flow tube loop; and the sensor assembly comprises a channel in the tube support that sweeps along a path in only a single plane.

Preferably, the thermal expansion bend is located on a portion of the flow tube located between one of the first manifold and the second manifold and a proximate anchor block to define a first apex.

Preferably, the height of the first apex is between 0.01 inches and 1 inch from a proximate non-bent portion of the flow tube.

Preferably, the thermal expansion bend is located on a portion of the flow tube located between the first anchor block and the second anchor block to define a second apex.

Preferably, the height of the second apex is between 0.01 inches and 1 inch from a proximate non-bent portion of the flow tube.

Preferably, the flowmeter comprises an offset bend in a crossover section of the flow tube.

Preferably, the channel in the tube support comprises a channel wherein an intrados of the flow tube engages the tube support only at the outermost edges to define a gap between the flow tube and the tube support that is between 0.0025 and 0.0035 inches and an extrados of the flow tube engages the tube support between the outermost edges to define a gap at the outermost edges.

DETAILED DESCRIPTION OF THE INVENTION

FIGS. 1-16 and the following description depict specific examples to teach those skilled in the art how to make and use the best mode of the invention. For the purpose of teaching inventive principles, some conventional aspects have been simplified or omitted. Those skilled in the art will appreciate variations from these examples that fall within the scope of the invention. Those skilled in the art will appreciate that the features described below can be combined in various ways to form multiple variations of the invention. As a result, the invention is not limited to the specific examples described below, but only by the claims and their equivalents.

Figure 1:
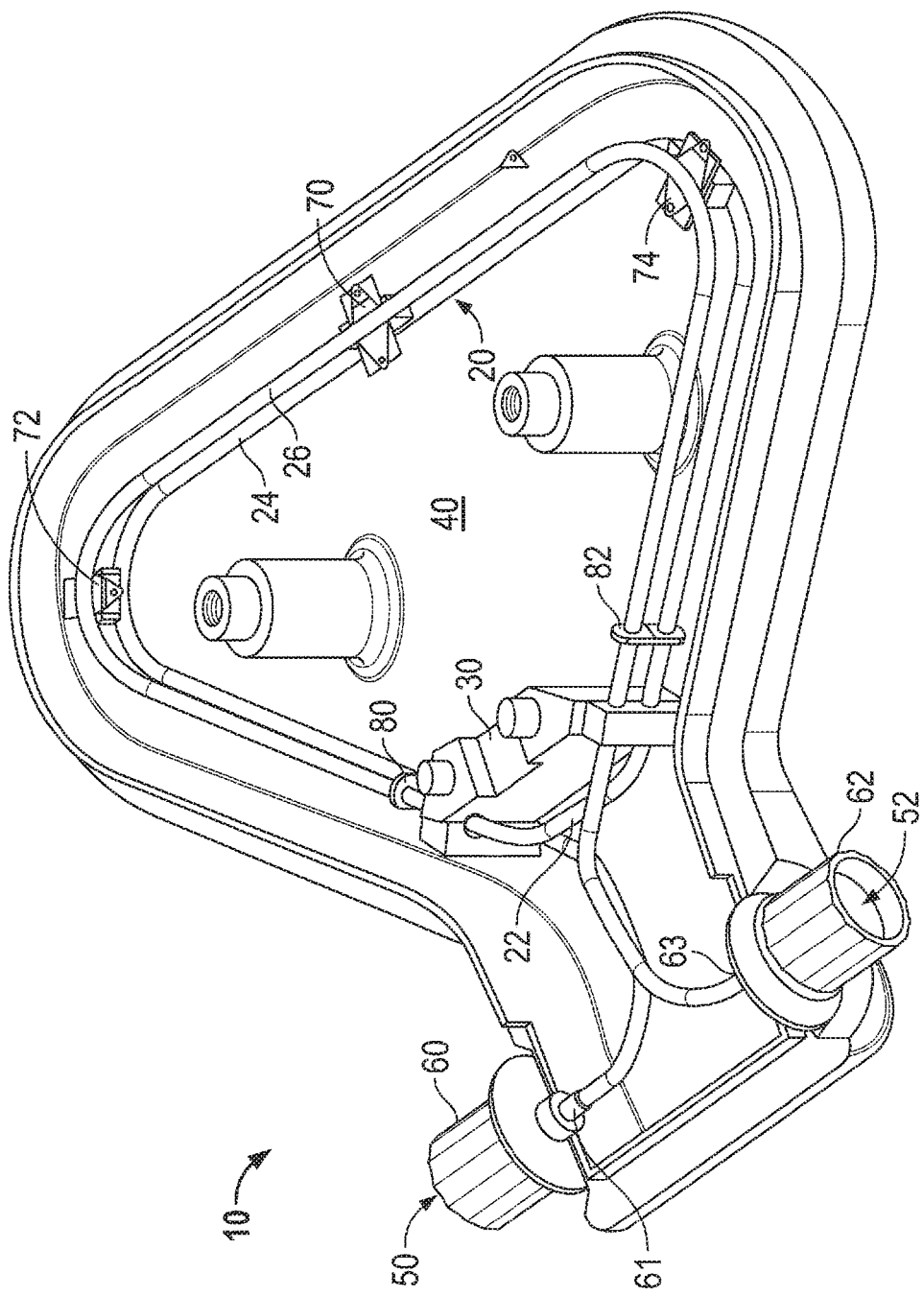
FIG. 1 shows a prior art flowmeter sensor assembly.

FIG. 1 illustrates a prior art flowmeter sensor assembly 10 including flow tube 20, anchor 30 and housing 40. Flow tube 20 is fixedly attached to anchor 30 at a location near cross-over section 22 of flow tube 20. Flow tube loops 24, 26 each extend from anchor 30 on one side of anchor 30. Cross-over section 22 extends from anchor 30 on an opposite side of anchor 30 from the flow tube loops 24, 26. One way to attach loops 24, 26 to anchor 30 is brazing the loops 24, 26 to the anchor 30. The anchor 30 may then be welded to housing 40.

The inlet 50 of flow tube 20 is connected to adapter 60 with, preferably, an orbital weld proximate location 61. Outlet 52 of flow tube 20 is connected to adapter 62 with preferably an orbital weld proximate location 63. Other connections besides welding such as brazing, mechanical fastening, adhesives, etc., are contemplated. Since inlet 50 and outlet 52 are not part of the vibrating, dynamic portion of the flowmeter, they can be arranged in any configuration. For example, inlet 50 and outlet 52 can be arranged in the orientation illustrated in FIG. 1. Conversely, the inlet 50 and outlet 52 may be arranged to be perpendicular to the orientation shown (or any angle in between).

A driver 70 is mounted at a midpoint region of flow tube loops 24 and 26 to oscillate loops 24 and 26 in opposition to each other. Left pickoff 72 and right pickoff 74 are mounted in the respective corners of the top sections of flow tube loops 24 and 26. Pickoffs 72, 74 sense the relative velocity of flow tube loops 24, 26 during oscillations. Brace bars 80, 82 are fixedly attached between loops 24, 26 of flow tube 20.

Figure 2:
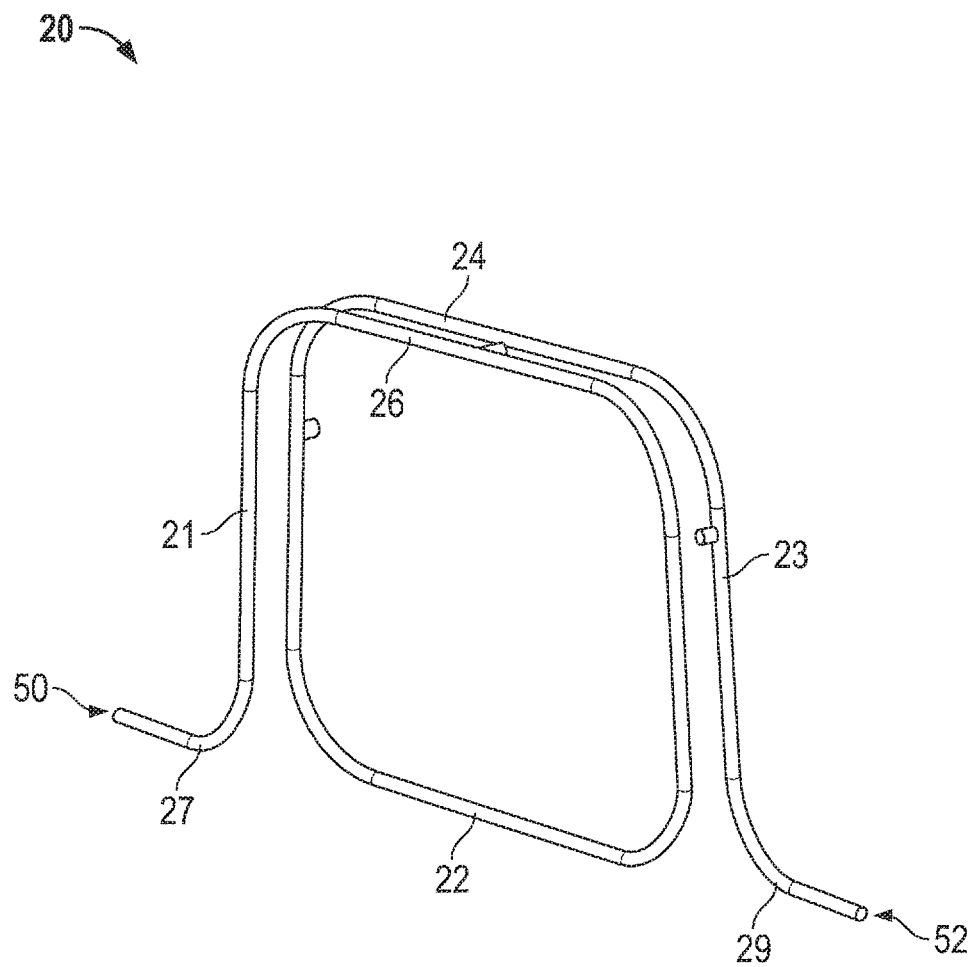
FIG. 2 shows an isometric view of a flow tube according to an embodiment.
Figure 3:
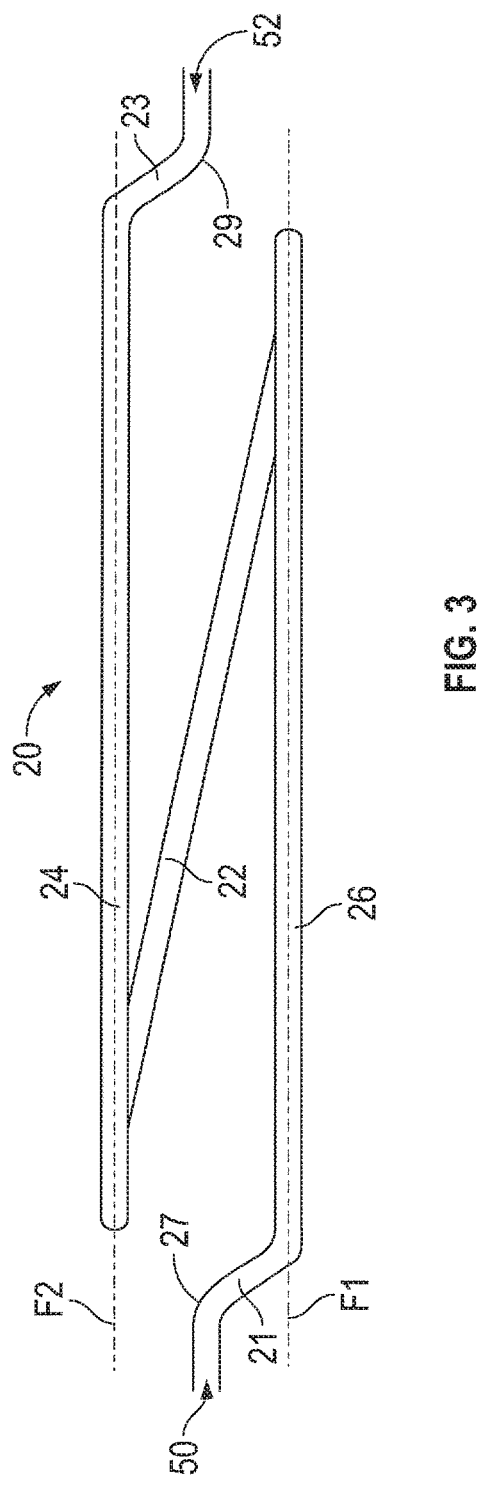
FIG. 3 shows a top view of the flow tube of FIG. 2.

FIGS. 2 and 3 illustrate a flow tube 20 according to an embodiment. The inlet 50 of flow tube 20 attaches to a process line (not shown) and receives a flowing material therefrom. Outlet 52 attaches to the process line to return the flowing material thereto. The flow tube 20 has two loops, 24 and 26. Crossover section 22 joins loops 24 and 26 to form one continuous flow tube 20. In an embodiment, the flow tube 20 is constructed from a single portion of tubing, and is bent into a desired shape and configuration. As illustrated, the flow tube 20 has an inlet bend 27 and outlet bend 29. The inlet 50 and outlet 52 are planar with a process line (not shown) and are not co-planar with either plane F1 or F2. (See FIG. 3 for a top view of FIG. 2) Inlet bend 27 joins inlet 50 to section 21, which crosses to plane F1 to connect with loop 26. An outlet bend 29 joins outlet 52 to section 23, which crosses to plane F2 to connect with loop 24. The inlet and outlet bends 27, 29 allow the sensor assembly 10 to be attached to the process line with the two loops 24, 26 remaining non-planar with the process line. In this embodiment, the inlet 50 and outlet 52 are planar.

Figure 4:
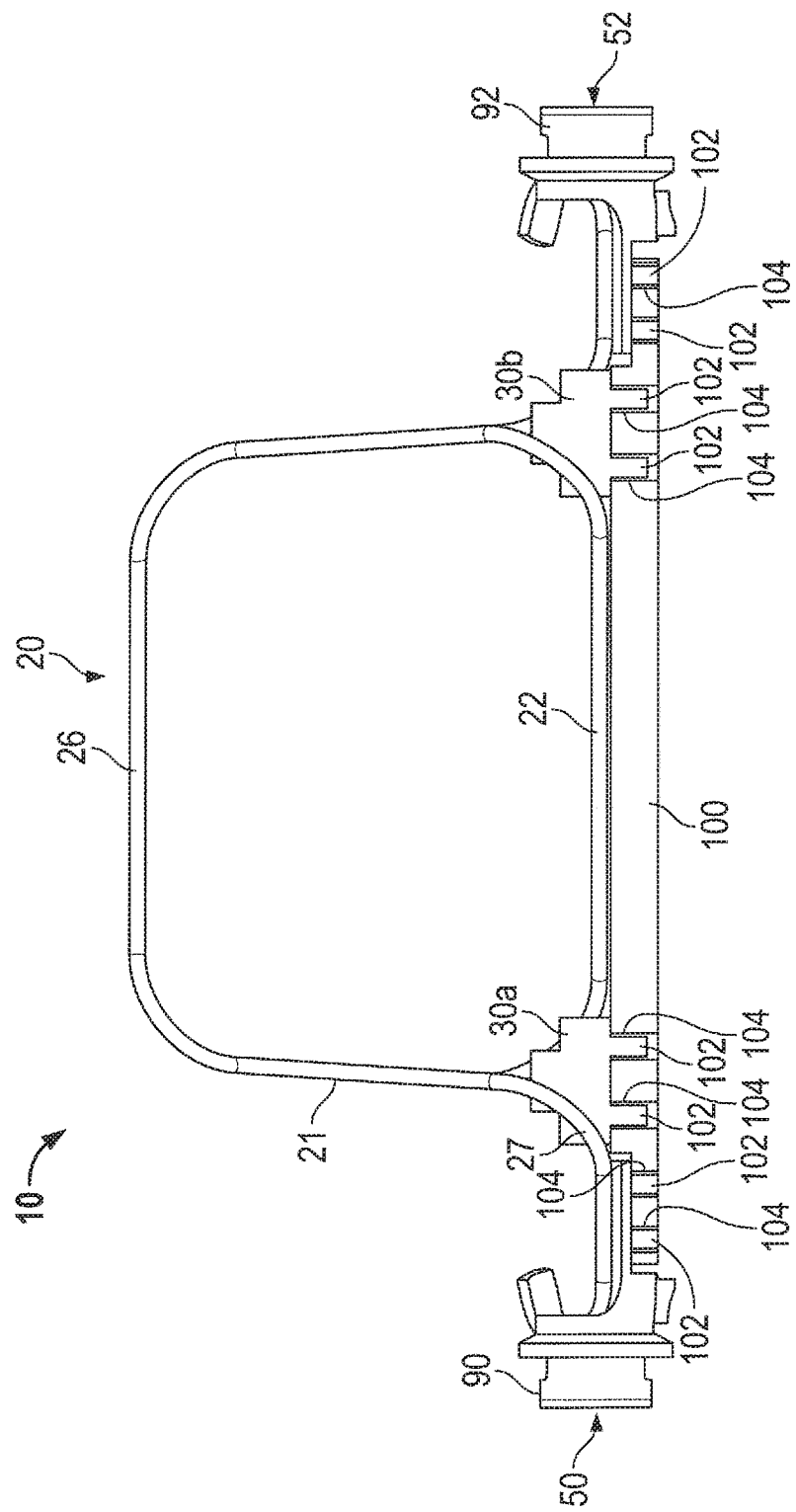
FIG. 4 shows a side view of a sensor assembly according to an embodiment.

FIG. 4 illustrates a sensor assembly 10 according to an embodiment. The flow tube 20 is attached to an inlet manifold 90 and an outlet manifold 92. The manifolds 90, 92 are in fluid communication with each other via the flow tube 20. In an embodiment, a first anchor block 30a is disposed proximate the inlet bend 27 and attached to the flow tube 20. A second anchor block 30b is disposed proximate the outlet bend 29 (see FIG. 2), and attached to the flow tube 20. A support block 100 provides a base to which the manifolds 90, 92 and anchor blocks 30a, 30b may be attached. By having the sensor assembly 10 divided into six main separate portions (flow tube 20, support block 100, first anchor block 30a, second anchor block 30b, inlet manifold 90, and outlet manifold 92), during the assembly process, these portions are allowed to "float" during the heating/cooling cycle of the brazing process, which accommodates the differing expansion/contraction rates of the flow tube 20, manifolds 90, 92, and anchor blocks 30a, 30b. It should be noted that the figures depict two anchor blocks 30a, 30b, but one anchor block is also contemplated, as is more than two anchor blocks.

Figure 5:
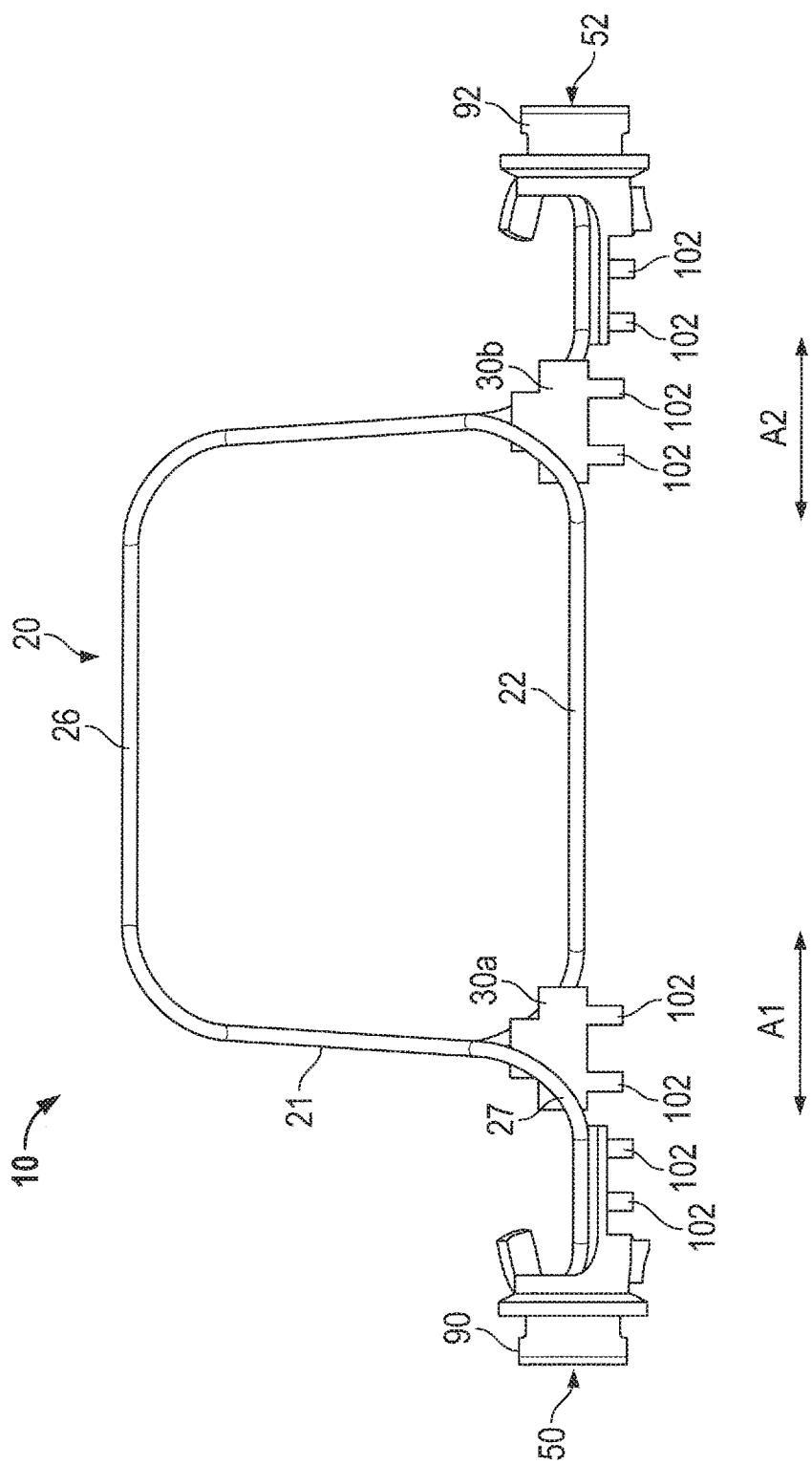
FIG. 5 shows a side view of a sensor assembly without a support according to an embodiment.

FIG. 5 illustrates the portions of the sensor assembly that are placed in a brazing furnace during the assembly process according to an embodiment. In an embodiment, the flow tube 20 is attached to the anchor blocks 30a, 30b via brazing. In an embodiment, the flow tube 20 may be attached to the manifolds 90, 92 via brazing. In an embodiment, the flow tube 20 may be attached to the manifolds 90, 92 via welding. In an embodiment, the flow tube 20 may be attached to the manifolds 90, 92 via brazing and welding. The arrows A1 and A2 illustrate the general direction of expansion/contraction that occurs due the heating/cooling cycle of the brazing process. If the support block 100 were present, the anchor blocks 30a, 30b, manifolds 90, 92, and flow tube 20 would be prevented from floating during the expansion/contraction cycle. This effectively locks the flow tube in place to the anchor blocks 30a, 30b and/or manifolds 90, 92, causing stresses induced by the different rates of cooling. In the absence of the support block 100, however, the anchor blocks 30a, 30b, manifolds 90, 92, and flow tube 20 are able to expand and contract with a requisite range of freedom since the assembly is not locked in place, so residual stresses to braze joints are reduced with a resultant lessening of cracked braze joints.

Figure 6:
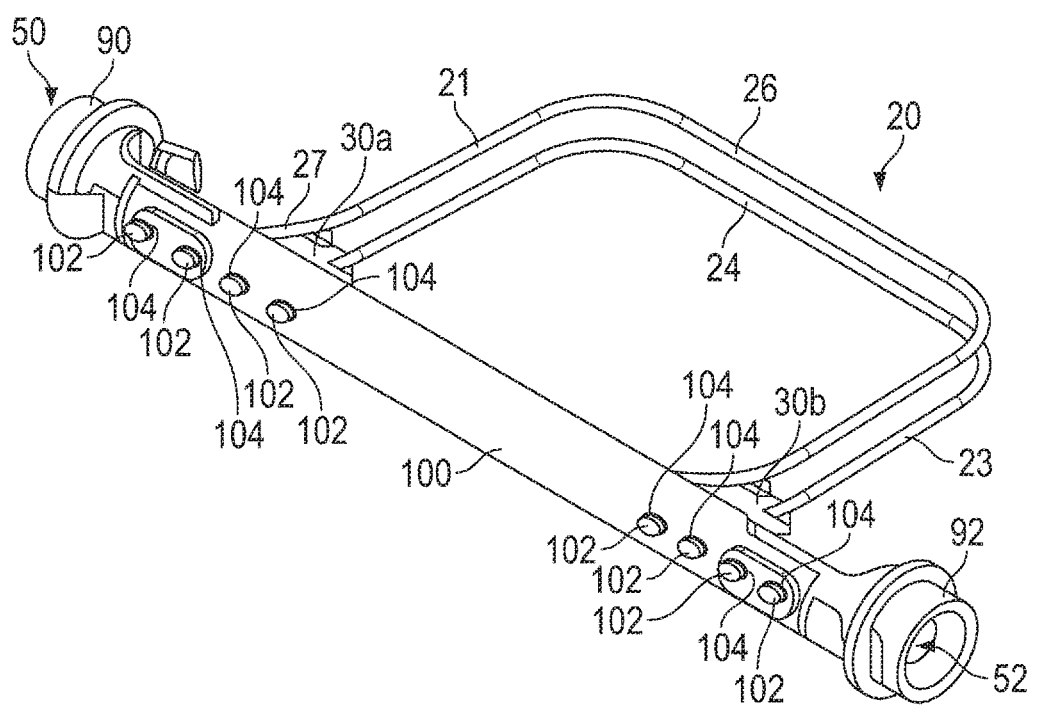
FIG. 6 shows a bottom isometric view of the sensor assembly of FIG. 4.

With additional reference to FIG. 6, once the assembly is brazed and allowed to sufficiently cool, the flow tube 20, first anchor block 30a, second anchor block 30b, inlet manifold 90, and outlet manifold 92 are attached to the support block 100. In an embodiment, bosses 102 are present on components such as the first anchor block 30a, second anchor block 30b, inlet manifold 90, and outlet manifold 92. The bosses 102 fit into corresponding apertures 104 present in the support block 100. In an embodiment, the bosses 102 locate the first anchor block 30a, second anchor block 30b, inlet manifold 90, and outlet manifold 92 in the support block 100 at precise predetermined locations. In an embodiment, the apertures 104 comprise slots that allow a predetermined freedom of movement. In an embodiment, the bosses 102 are plug welded to the support block 100, however other attachment means not limited to mechanical fasteners, adhesives, etc. are also contemplated. Attaching the anchor blocks 30a, 30b to the support block 100 may reduce axial loading of the assembly. It is also contemplated that bosses be provided on the support block 100, and apertures be provided on the first anchor block 30a, second anchor block 30b, inlet manifold 90, and/or outlet manifold 92. The support block 100 and/or inlet manifold 90 and outlet manifold 92 may be attached to a flowmeter case.

Figure 7:
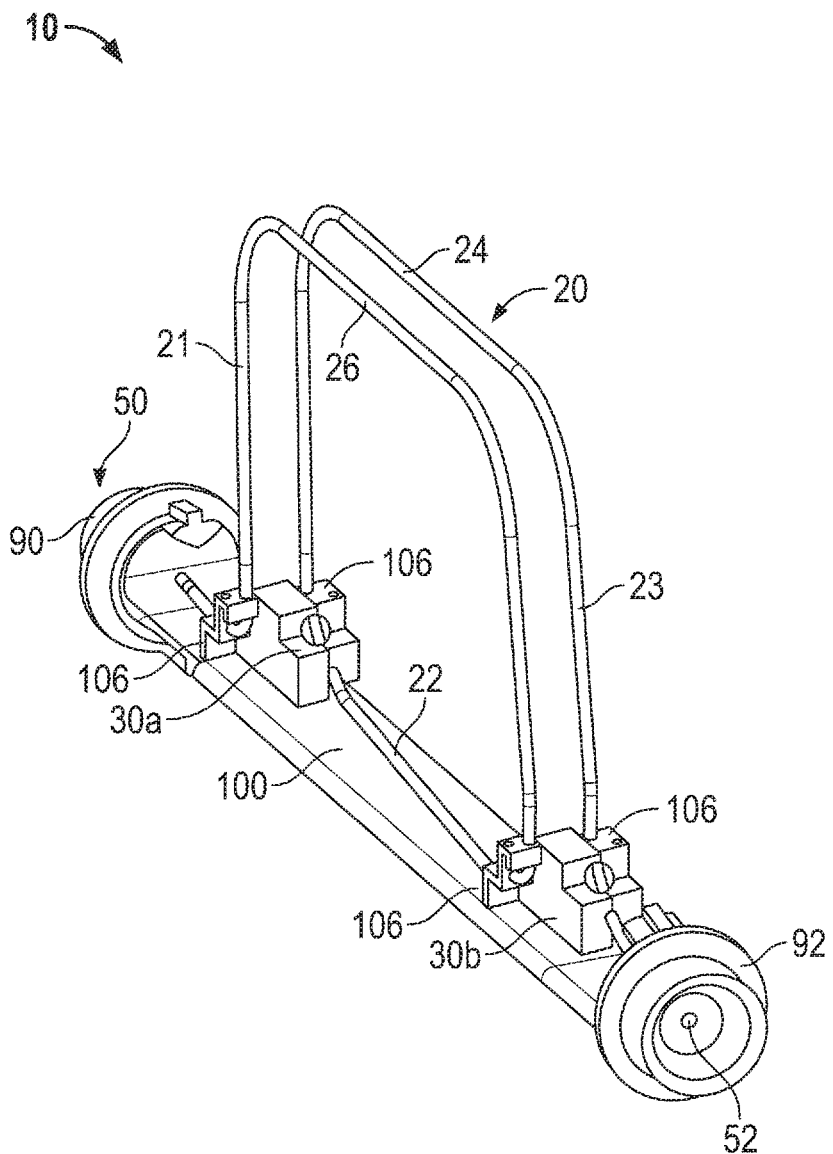
FIG. 7 shows a top isometric view of the sensor assembly of FIGS. 4 and 6 with tube supports.

FIG. 7 illustrates an embodiment comprising tube supports 106. The tube supports 106 are attached to at least one of the support block 100 and the anchor blocks 30a, 30b. In an embodiment, a single tube support 106 is provided with each anchor block 30a, 30b. In another embodiment, at least two tube supports 106 are provided with each anchor block 30a, 30b. The tube supports 106 may be mechanically fastened to either or both the support block 100 and/or the anchor blocks 30a, 30b. Other fastening means such as welding, brazing, and/or adhesives are also contemplated.

The tube supports 106 serve to brace the flow tube 20, thus providing additional support and stiffness to the flow tube 20, which may reduce axial loading of the assembly as a whole, and also serve to isolate the flow tube 20 and related components from vibrations external to the sensor assembly 10.

Figure 8:
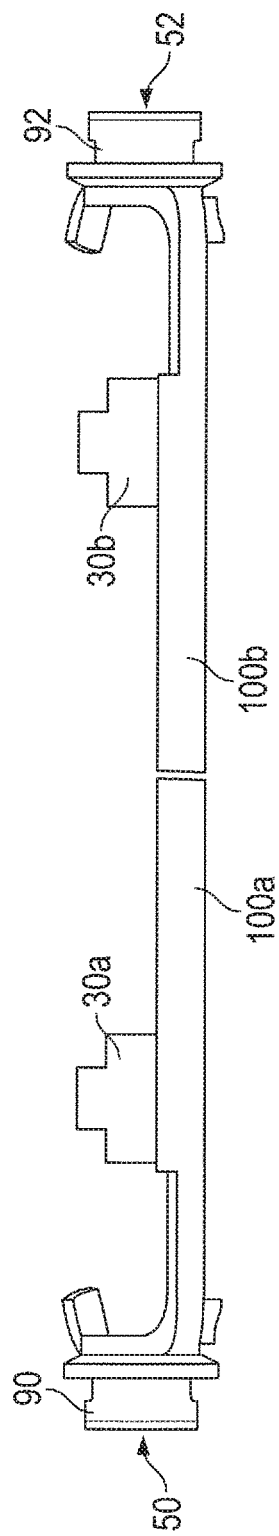
FIG. 8 shows a side view of a sensor assembly according to an embodiment.

FIG. 8 discloses another embodiment wherein each anchor block 30a, 30b is pre-attached to support block portion 100a, 100b, respectively. A number of features, such as the flow tube 20, for example, are omitted in the figure for clarity. By combining each anchor block 30a, 30b with a support block portion 100a, 100b, this reduces the number of components in the assembly, as anchor block 30a is placed in the brazing oven already attached to support block portion 100a. Likewise, anchor block 30b is placed in the brazing oven already attached to support block portion 100b. The anchor blocks 30a, 30b may be attached to support block portions 100a, 100b through welding, brazing, mechanical fasters, adhesives, etc., or alternatively may be formed from the same piece of material, such as through a machining or other construction process, for example. In this embodiment, by having the sensor assembly 10 divided into five main separate portions (flow tube 20, first anchor block/support block 30a/100a, second anchor block/support block 30b/100b, inlet manifold 90, and outlet manifold 92), during the assembly process, these portions are allowed to independently "float" during heating/cooling cycles of the brazing process, which accommodates the differing expansion/contraction rates of the flow tube 20, manifolds 90, 92, and anchor blocks 30a, 30b. After the assembly has cooled, the support blocks 100a, 100b may be connected to each other by welding, brazing, mechanical fasteners, adhesives, etc.

Figure 9:
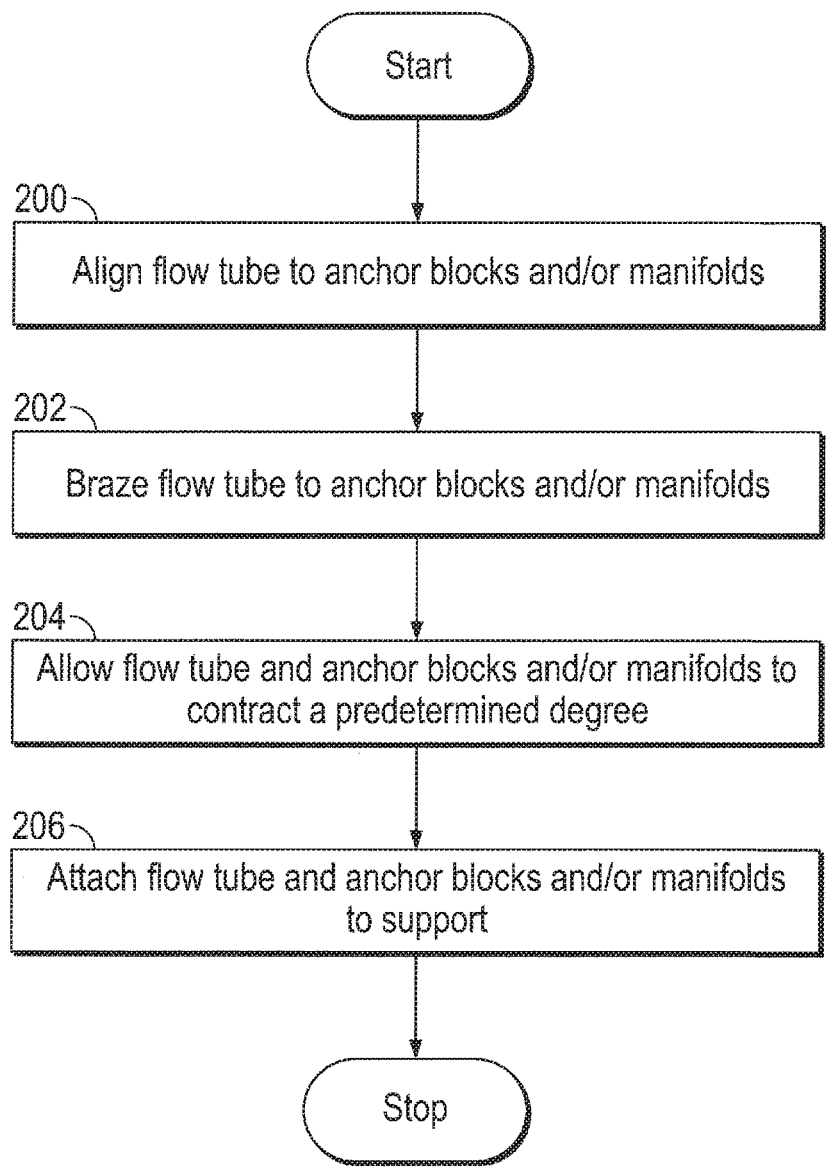
FIG. 9 is a flow chart illustrating a method of fabricating a portion of the sensor assembly according to an embodiment.

FIG. 9 depicts a flow chart illustrating the steps for fabricating a portion of the sensor assembly 10 according to an embodiment. The assembly process begins with step 200. During step 200, components of the sensor assembly 10 are placed into a desired alignment/orientation. In particular, those portions of the sensor assembly 10 that are to be brazed are placed into a position that is desired, such as aligning the flow tube 20 with anchor blocks 30a, 30b and/or aligning the flow tube 20 with manifolds 90, 92. In an embodiment, the flow tube 20 is aligned such that the inlet 50 and outlet 52 are in-line with one another and in-line with the pipeline to which the flowmeter would be attached. Therefore, during step 200 the flow tube may be bent accordingly. In an embodiment, a fixture or jig is used to maintain the assembly in the desired orientation.

In step 202, the flow tube 20 is brazed to the anchor blocks 30a, 30b and/or the manifolds 90, 92. In an embodiment, necessary attachments to the flow tube 20 are made during this step. This includes any brace bar brackets 80, 82, pick-off sensor attachments and driver attachments to the flow tube 20. The parts to be brazed may be cleaned and/or abraded prior to brazing, according to an embodiment. Flux may also be applied to braze joints to prevent oxides from forming during the heating process, however, flux incorporated into filler metal is also contemplated. Filler metal is applied to form brazed joints between the flow tube 20 and the anchor blocks 30a, 30b and/or the manifolds 90, 92. The filler metal comprises at least one braze alloy formed as a cream, paste, powder, ribbon, rod, wire, and preformed shapes (such as shims, for example without limitation, that conform to the flow tube 20 or anchor blocks 30a,30b, or manifolds 90, 92). In an embodiment, the filler metal comprises at least one of aluminum, beryllium, bismuth, boron, brass, cadmium, carbon, chromium, cobalt, copper, gold, silver, iron, lead, manganese, molybdenum, nickel, palladium, phosphorus, silicon, silver, tin, titanium, zinc, and zirconium, however any filler metal known in the art is contemplated. The environment in which brazing occurs may comprise air, ammonia, argon, carbon dioxide, carbon monoxide, helium, hydrogen, inorganic vapors, nitrogen, noble gasses, and any other gas/fuming known in the art. Brazing may be accomplished under vacuum, under pressure, or at ambient pressure. The brazing process may be accomplished via a direct flame or an indirect heat source, such as a furnace, for example without limitation. Alternatively, one could perform multiple welding operations to complete the necessary attachments to the flow tube. The result of this step is a relatively complete sensor assembly.

Step 204 reflects the cooling of the flow tube 20, anchor blocks 30a, 30b and/or manifolds 90, 92 that occurs after brazing. These portions are allowed to cool, which results in a contraction. Since the flow tube 20, anchor blocks 30a, 30b and/or manifolds 90, 92 are allowed to "float" to some degree, this accommodates the differing expansion/contraction rates of the flow tube 20, anchor blocks 30a, 30b, and/or manifolds 90, 92, so to reduce related stresses. Once sufficiently cooled, the flow tube 20, anchor blocks 30a, 30b and/or manifolds 90, 92 are attached to a support block 100, as indicated in step 206. It should be noted that in embodiments where each anchor block 30a, 30b is pre-attached to support block portion 100a, 100b, respectively, step 206 instead comprises attaching support block portions 100a, 100b together. Any necessary internal wiring for the sensor assembly 10 may also be completed during or after step 206.

Figure 10:
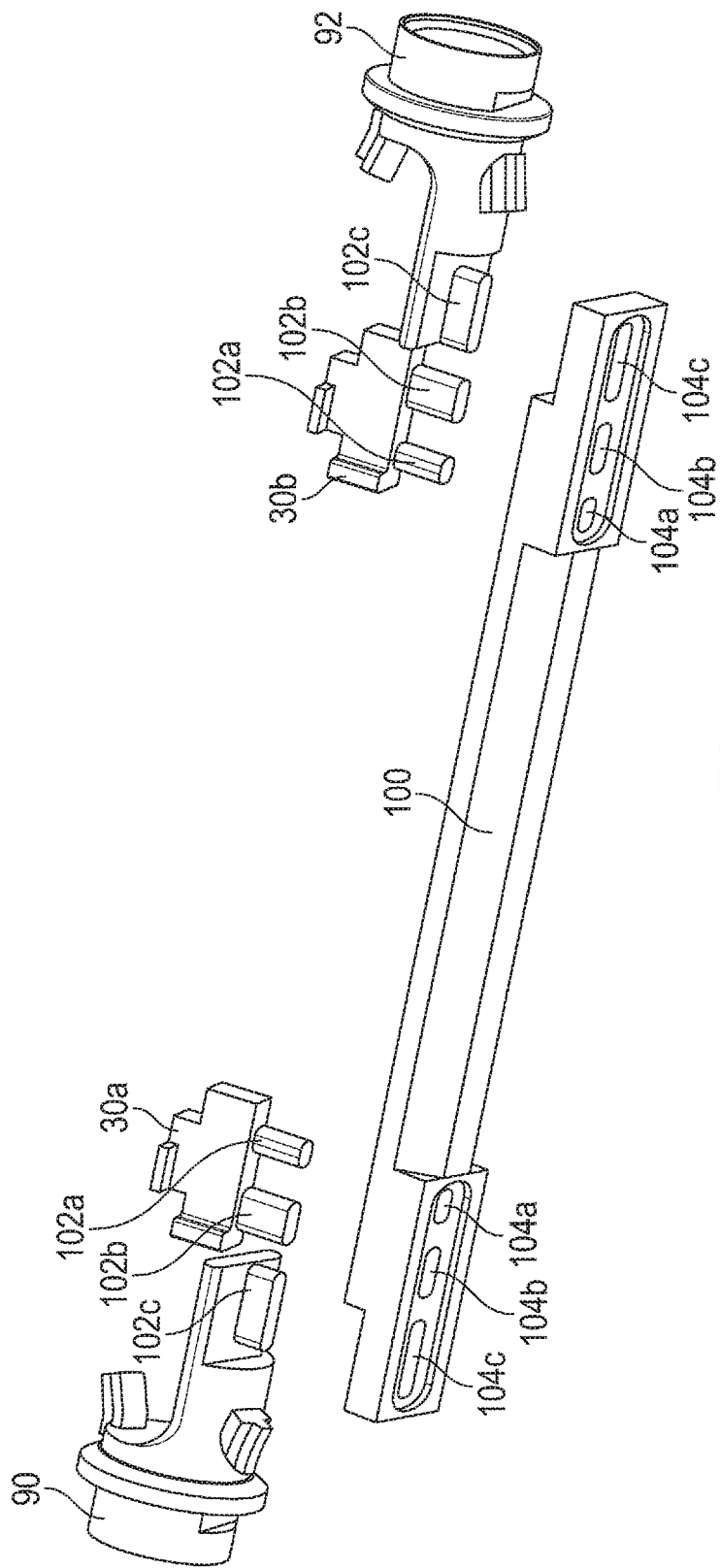
FIG. 10 shows a bottom isometric view of a sensor assembly according to another embodiment.
Figure 11:
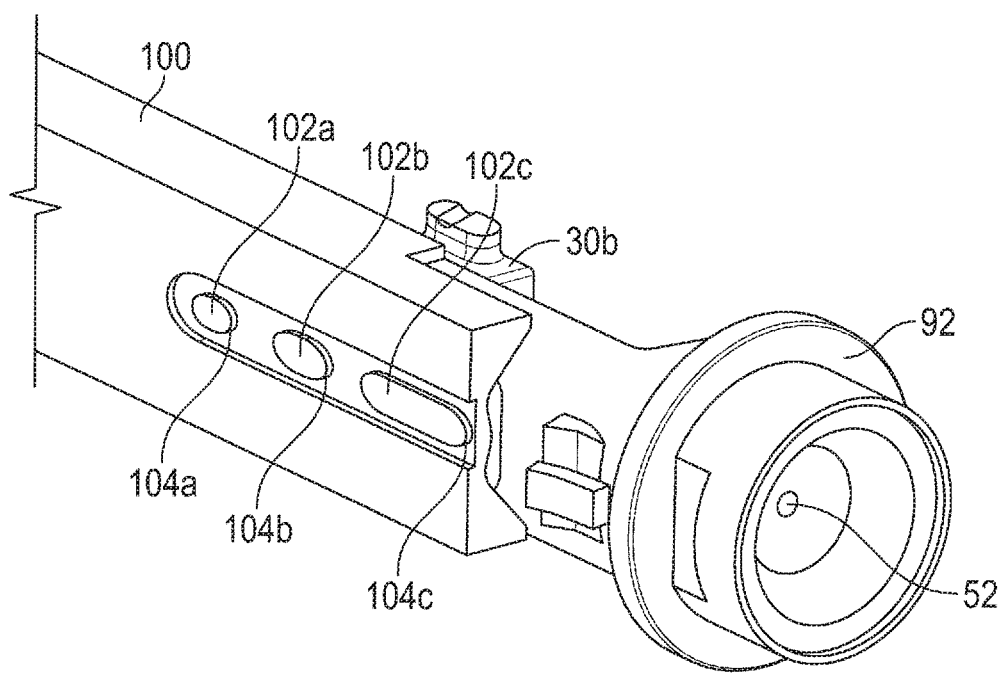
FIG. 11 shows an alternate view of the sensor assembly of FIG. 10.

FIGS. 10 and 11 illustrate an alternate embodiment of the bosses 102 and mating apertures 104 illustrated in FIGS. 4-6. In this embodiment, the bosses 102a and 102b are different in size and/or dimension from each other. In the embodiment illustrated, 102b is an elongated circular shape, while 102a is round. The mating apertures 104a and 104b have a size and dimension to accommodate the bosses 102a, 102b. By making the bosses 102a, 102b different sizes and/or dimensions, the anchor blocks 30a, 30b can only be inserted into the support block 100 in a predetermined orientation, thus rendering assembly errors less likely. It should be noted that the use of two bosses 102a, 102b is merely an example, and one boss having an asymmetrical shape could accomplish the same task. Similarly, three or more bosses could also be provided. In the case where three or more bosses are provided, all bosses may have the same or similar size and dimension, but the orientation of bosses may be configured to allow only a single, correct, mating orientation with the support block 100 during assembly. Other shapes are also contemplated, besides round or elongated round. Square, rectangular, polygonal, polyhedral, curved, or any other shapes known in the art are contemplated.

Like for the anchor blocks 30a, 30b, the manifolds 90, 92, as shown in FIGS. 10 and 11 may also have a boss 102c that forces the manifold to engage the aperture 104c in only a single, correct, orientation. The mating aperture 104c has a size and dimension to accommodate the boss 102c. It should be noted that the use of a single boss 102c is merely an example, as multiple bosses, as in the above examples, may accomplish the same task. In the case where multiple bosses are provided, all bosses may have the same or similar size and dimension, but the orientation of bosses may be configured to allow only a single, correct, mating orientation with the support block 100 during assembly. Other shapes are also contemplated, besides the elongated round boss 104c illustrated, as this shape is provided as an example.

Square, circular, rectangular, polygonal, polyhedral, curved, or any other shapes known in the art are also contemplated.

In a related embodiment, the bosses 102a-c project through the apertures 104a-c in the support block 100 so to be approximately flush with a bottom portion of the support block 100, as illustrated in FIG. 11. This provides the appropriate clearances to allow the bosses 102a-c to be welded to the support block 100. In an embodiment, the clearances are such that autogenous welding of the bosses 102a-c to the support block 100 is possible. It should be noted that the anchor blocks 30a, 30b and/or the manifolds 90, 92 may alternatively comprise apertures 104a-c with the support block 100 comprising bosses 102a-c.

Figure 12:
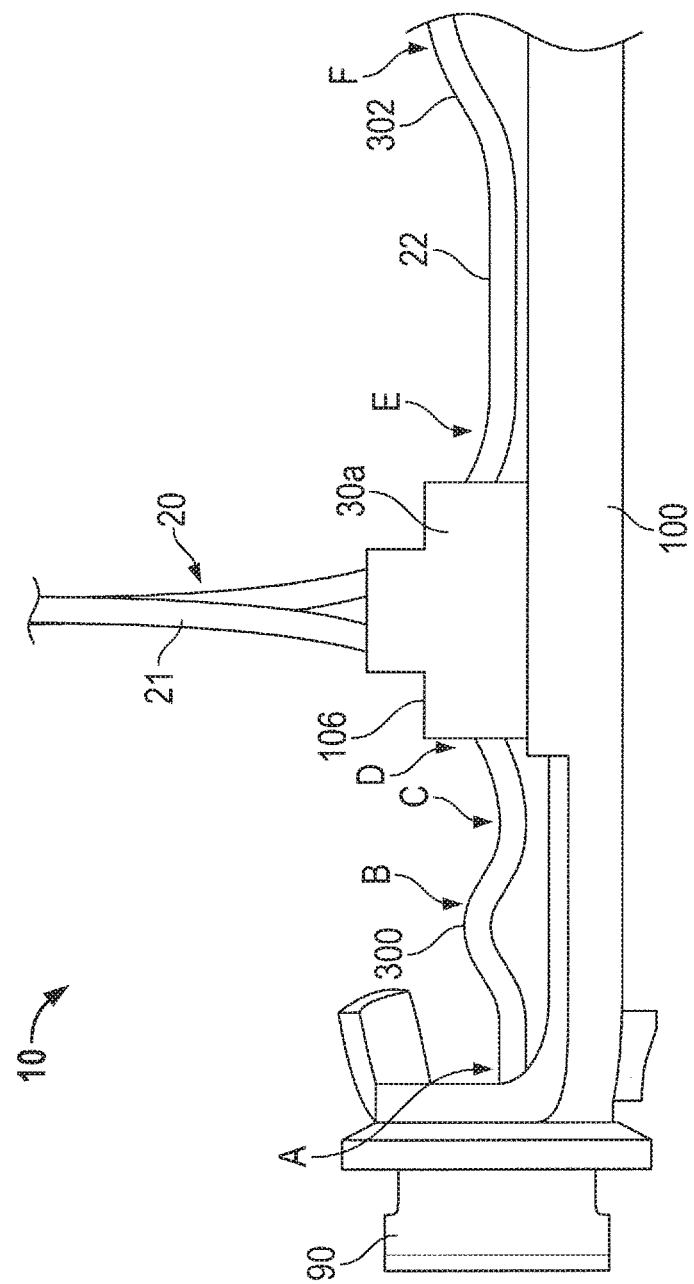
FIG. 12 shows a partial view of an embodiment of a sensor assembly having thermal expansion bends.

Turning to FIG. 12, another embodiment is illustrated. It should be noted that for illustrative purposes FIG. 12 is only a partial view of one side of the sensor assembly 10, but the embodiments described may apply to portions of the assembly 10 not visible in this illustration, as will be readily apparent. The flow tube 20 is constructed of a relatively thin-walled material—especially when compared to the material mass and thickness of support components such as the support block 100, anchor block 30a, and manifold 90 for example, without limitation. When a process fluid of a given temperature is introduced into the sensor assembly 10, due to different component masses, the temperature of the flowtube 20 will change at a greater rate than the support components, thus introducing thermal stresses to the sensor assembly 10. For example, without limitation, if a process fluid at a temperature of 400° F. were introduced into the sensor assembly 10 having a temperature of 70° F., it is estimated that the flowtube 20 would experience thermal stresses of over 25,000 psi. American Society of Mechanical Engineers (ASME) standard B31.3 requirements for piping indicate a maximum flow tube 20 stress of only 19,300 psi, thus such temperature differentials can cause conditions wherein the maximum safe operating stress is exceeded. In an embodiment, the flow tube 20 comprises a series of bends that reduce induced thermal stresses versus a similarly shaped flow tube 20 having mostly straight sections.

Placing a bend in the flow tube 20 between the manifold 90 and the anchor block 30a aids in alleviating stress induced by thermal expansion in the flow tube 20. In an embodiment, a thermal expansion bend 300 is located proximate location "B". This is merely an example, and the thermal expansion bend 300 can be located at other points between the manifold 90 and the anchor block 30a. Though illustrated as being closer to the manifold 90 than the anchor block 30a, in an embodiment the thermal expansion bend 300 is closer to the anchor block 30a. In yet another embodiment, the thermal expansion bend 300 is approximately equidistant from the manifold 90 and the anchor block 30a. To reiterate, it should be readily apparent that this is an example illustrating only one side of the sensor assembly 10, and that the portion of the flow tube 20 between the manifold 92 and the anchor block 30b may also comprise thermal expansion bends 300. The height of the apex of the thermal expansion bend 300 is preferably between 0.01 inches and 1 inch higher than a neighboring non-bent portion of the flow tube 20. In one embodiment, the thermal expansion bend 300 is approximately 0.14 inches high. In another embodiment the thermal expansion bend 300 is approximately 0.05 inches. Additionally, the thermal expansion bend 300 is illustrated as having an apex that points away from the support block 100, but may also point towards the support block, or lie on any plane therebetween.

In another example, there may be one or more thermal expansion bends between the anchor blocks 30a and 30b. In an embodiment, a thermal expansion bend 302 is located proximate location "F". This thermal expansion bend 302, on the crossover section 22, may be only a single thermal expansion bend 302 at approximately the halfway point between the anchor blocks 30a and 30b or may be closer to one anchor block 30a or 30b than the other anchor block 30b or 30a, respectively (only anchor block 30a is visible in FIG. 12). The height of the apex of the thermal expansion bend 302 is preferably between 0.01 inches and 1 inch higher than a neighboring non-bent portion of the flow tube 20. In one embodiment, the thermal expansion bend 302 is approximately 0.14 inches. In another embodiment the thermal expansion bend 302 is between approximately 0.01 and 0.02 inches. In another embodiment, there may be more than one thermal expansion bend 302 on the crossover section 22.

Figure 13:
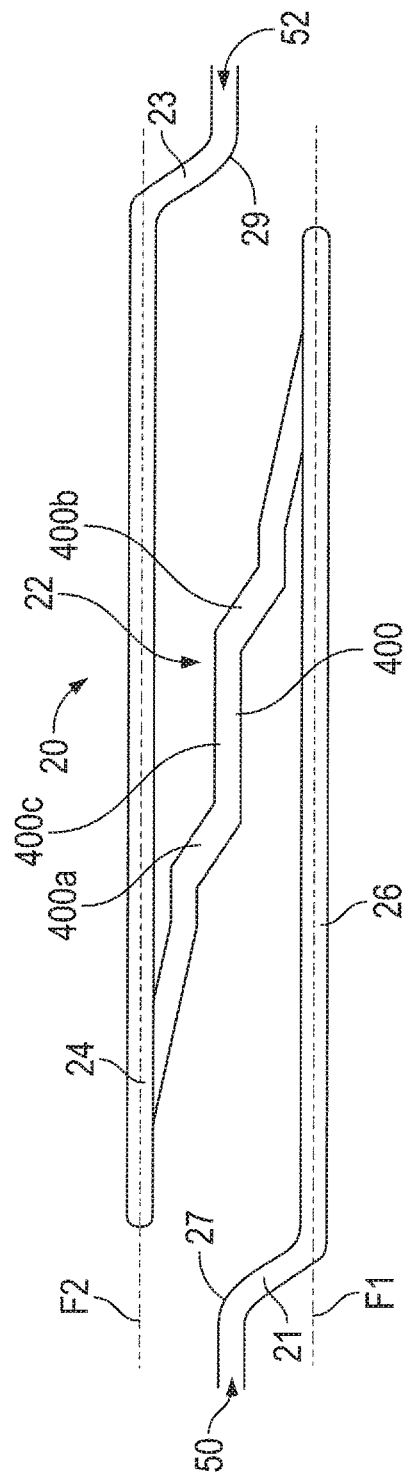
FIG. 13 shows an embodiment of a flow tube.
Figure 14:
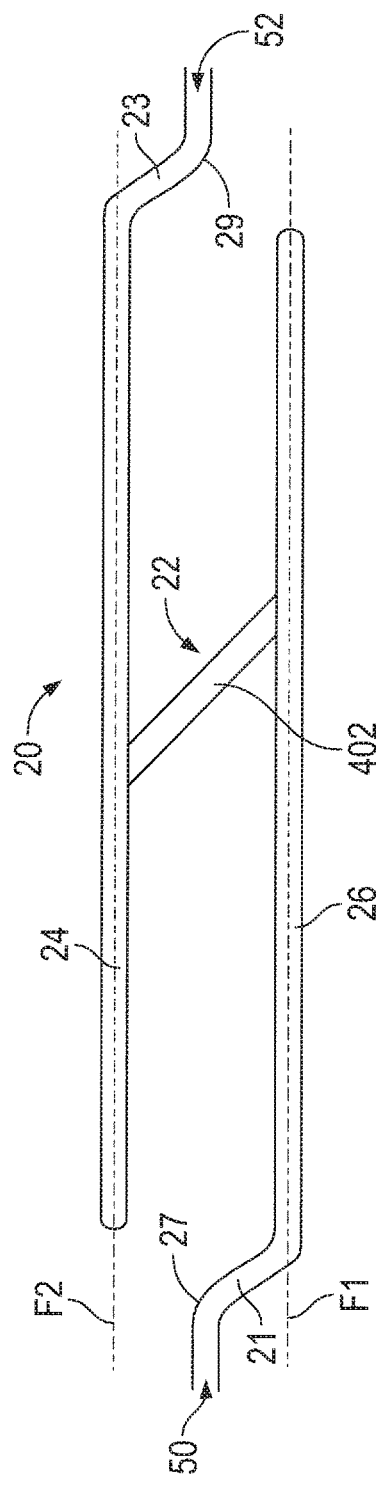
FIG. 14 shows another embodiment of a flow tube.

FIGS. 13 and 14 illustrate embodiments of a flow tube 20 wherein an offset bend 400 (FIG. 13), 402 (FIG. 14) is located in the crossover section 22. In these embodiments, the offset bend 400, 402 acts as an expansion buffer such that thermal stresses are minimized with the flow tube 20, as discussed above. The offset bend 400, illustrated in FIG. 13 has two bends 400a, 400b with a straight portion 400c therebetween. In a related embodiment, as shown in FIG. 14, the crossover section 22 comprises an offset bend 402 that is similar to that of FIG. 3, but with more acute bends that minimize thermal stresses. Though a simple bend is illustrated, a loop, wave, zig-zag, or similar shape is also contemplated for the crossover section 22. Such structures provide some flex in the crossover section 22 to accommodate thermal expansion, thus buffering braze joints between the flow tube 20 and either anchor block 30a, 30b from experiencing otherwise detrimental forces caused by thermal expansion.

Figure 15:
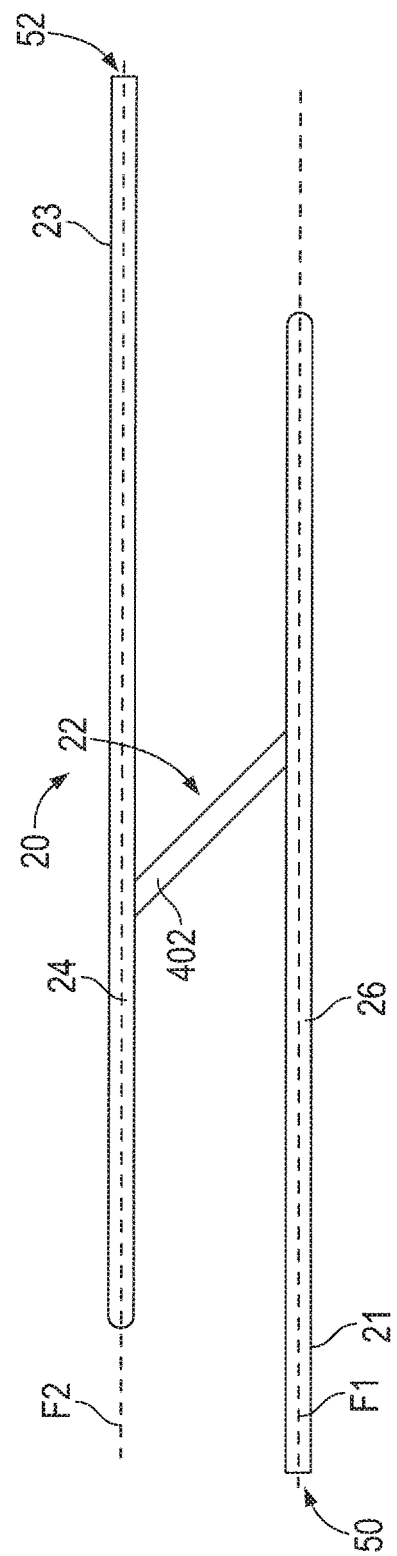
FIG. 15 shows yet another embodiment of a flow tube.
Figure 16:
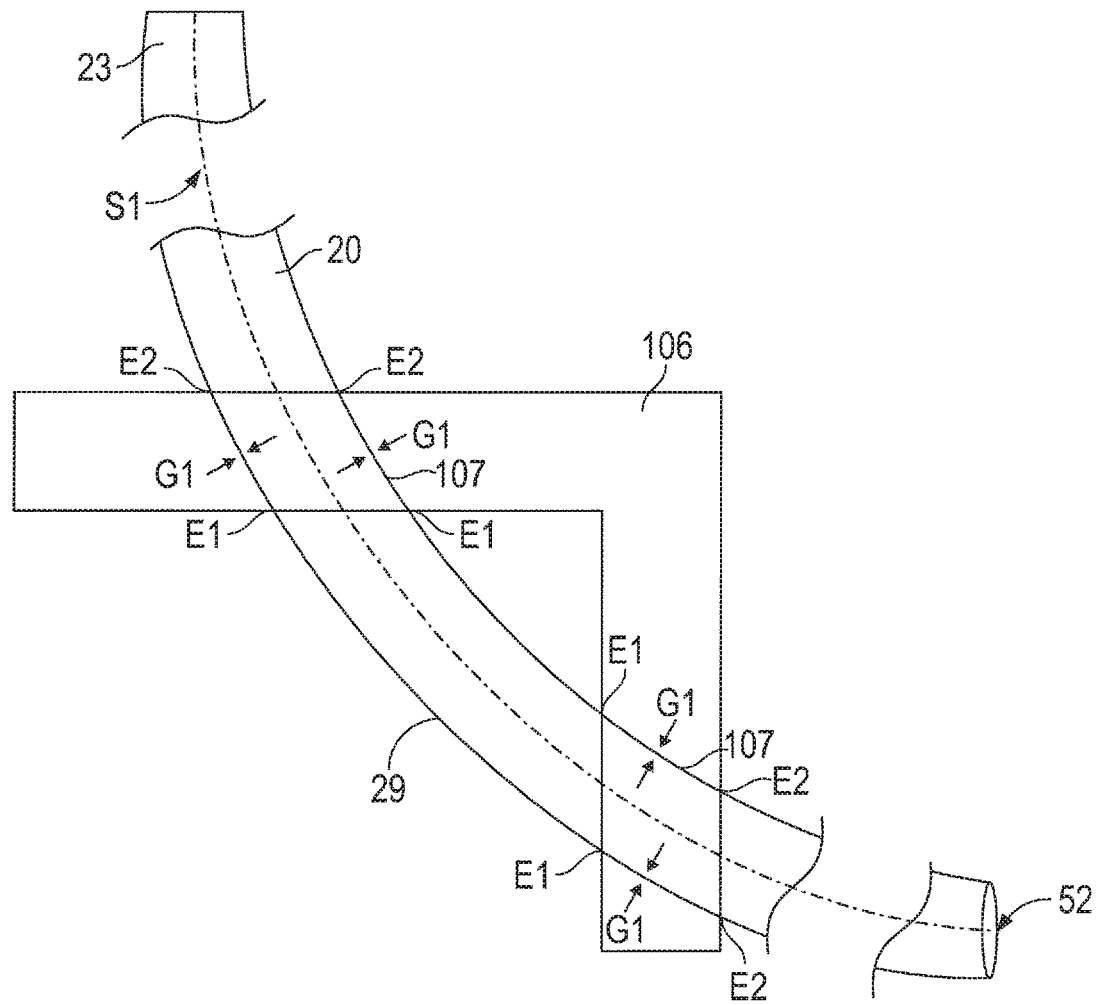
FIG. 16 shows an embodiment of a support having a channel formed therein that sweeps along a path in a single plane.

The anchors 30a, 30b and tube supports 106 illustrated in FIGS. 4-8 utilize cuts therein that accommodate the flowtube 20 that are simultaneously semi-circular and radially sweeping. This is a difficult and costly machining operation, but is necessary to accommodate the compound bends of the flow tube 20. Turning now to FIG. 15, it will be clear that, in an alternate embodiment, by incorporating the offset bend 402 in the crossover section 22 of FIG. 14 in addition to sections 21 and 23 of the flow tube that remain in planes F1 and F2, respectively, that the cuts in anchors 30a, 30b and tube supports 106 need not be compound in nature. FIG. 16 illustrates an embodiment of a support 106 illustrating a channel 107 formed therein that sweeps along path 51 in a single plane. This channel 107 may be straight or radiused. This is a far simpler manufacturing operation than what is required by simultaneously semi-circular and radially sweeping paths that occur in different planes. The single-plane sweep channel 107 in one of the tube supports 106 accommodates the offset bend 402 in the crossover section 22. This single-plane sweep channel 107 may be mirrored in the anchors 30a, 30b, so that the flow tube 20 is able to be sandwiched between the support 106 and the anchors 30a, 30b. Additionally, by keeping sections 21 and 23 of the flow tube in planes F1 and F2, as noted above, the same style single plane sweep channel 107 of the support 106 and the anchors 30a, 30b is also used in a support 106 that accommodates sections 21 and 23 of the flow tube 20 and not just the crossover section 22.

Besides simplifying manufacture and reducing costs, this embodiment produces a more robust sensor assembly 10 that is able to withstand greater thermal stress due to increased braze joint strength. The ideal braze filler metal thickness is approximately 0.003 inches. A flow tube 20 having simultaneously semi-circular and radially sweeping bends sandwiched between mating anchors 30a, 30b and tube supports 106 also having simultaneously semi-circular and radially sweeping channels, as illustrated in FIGS. 4-8, is prone to being biased to one side or the other of the channel in which the flow tube 20 is disposed. For example, regions may exist where one side of the braze joint has no gap whatsoever, yet the other side of the joint has a 0.006 inch gap filled with braze filler material. Thus, it is not always possible to achieve an ideal 0.003 inch gap size. Single plane sweeping channels 107 along path 51 are, in an embodiment, configured so that the intrados of flow tube 20 contacts the bodies of the support 106 and the anchors 30a, 30b only at the outermost edges E1 and E2 of the sweeping channel 107. This defines a gap G1 that is between 0.0025 and 0.0035 inches. In an embodiment the gap G1 is approximately 0.003 inches. In the same embodiment, the extrados of flow tube 20 contacts the bodies of support 106 and the anchors 30a and 30b at location G1 of channel 107 creating gaps at E1 and E2 between 0.0025 and 0.0035 inches. Though only a support 106 is illustrated, it should be understood that the same orientation for the channel 107, cuts, sweeps, gaps, fitment, etc. apply for the anchors 30a, 30b. Also, a 90° bracket is illustrated, but a "stair-step" block, such as that shown in FIG. 7 could also accommodate single plane sweeping channel 107 along a path in a similar manner as that shown in FIG. 16.

The present invention, as described above, provides various apparatuses and methods to reduce stress inherent in the heating and cooling cycles associated with brazing of flowmeter elements of a vibrating flowmeter, such as a Coriolis flowmeter. Although the various embodiments described above are directed towards flowmeters, specifically Coriolis flowmeters, it should be appreciated that the present invention should not be limited to Coriolis flowmeters, but rather the methods described herein may be utilized with other types of flowmeters, or other vibrating sensors that lack some of the measurement capabilities of Coriolis flowmeters.

The detailed descriptions of the above embodiments are not exhaustive descriptions of all embodiments contemplated by the inventors to be within the scope of the invention. Indeed, persons skilled in the art will recognize that certain elements of the above-described embodiments may variously be combined or eliminated to create further embodiments, and such further embodiments fall within the scope and teachings of the invention. Thus, although specific embodiments of, and examples for, the invention are described herein for illustrative purposes, various equivalent modifications are possible within the scope of the invention, as those skilled in the relevant art will recognize. The teachings provided herein can be applied to other vibrating sensors, and not just to the embodiments described above and shown in the accompanying figures. Accordingly, the scope of the invention should be determined from the following claims.

We claim:

1. A sensor assembly (10) for a flowmeter, comprising:
a flow tube (20) configured to comprise a first loop (24) and a second loop (26) connected by a crossover section (22), wherein the flow tube (20) comprises at least one thermal expansion bend (300, 302);
a first anchor block (30a) and a second anchor block (30b) that are each attachable to the flowtube (20) proximate the crossover section (22);
at least one tube support (106) attachable to at least one of the first anchor block (30a) and the second anchor block (30b);
a first manifold (90) and a second manifold (92) that are attachable to an inlet (50) and an outlet (52) of the flow tube (20), respectively;
a support block (100) attachable to the first anchor block (30a), second anchor block (30b), first manifold (90), and second manifold (92); and
wherein the flow tube (20), first anchor block (30a), second anchor block (30b), first manifold (90), and second manifold (92) are configured to allow a predetermined degree of movement due to heating and cooling cycles when not attached to the support block (100).

2. The sensor assembly (10) of claim 1 wherein:
the first anchor block (30a) and the second anchor block (30b) are brazed to the flow tube (20); and
the first manifold (90) and the second manifold (92) are at least one of welded and brazed to the flow tube (20).

3. The sensor assembly (10) of claim 1 comprising:
at least one boss (102) defined by each of the first anchor block (30a) and the second anchor block (30b); and
at least one aperture (104) defined by the support block (100) having a size and dimension to engage the at least one boss (102).

4. The sensor assembly (10) of claim 1 comprising:
at least one aperture (104) defined by each of the first anchor block (30a) and the second anchor block (30b); and
at least one boss (102) defined by the support block (100) having a size and dimension to engage the at least one aperture (104).

5. The sensor assembly (10) of claim 1 wherein the first manifold (90) comprises a first support block portion (100a) and the second manifold (92) comprises a second support block portion (100b), wherein the first and second support block portions (100a, 100b) are attachable to each other to form a support block (100).

6. The sensor assembly (10) of claim 5 wherein the first and second support block portions (100a, 100b) are welded to each other.

7. The sensor assembly (10) of claim 1 comprising:
at least one boss (102a, 102b) defined by each of the first anchor block (30a) and the second anchor block (30b); and
at least one mating aperture (104a, 104b) defined by the support block (100) having a size and dimension to engage the at least one boss (102a, 102b), wherein the size and dimension of the at least one boss (102a, 102b) is keyed to the at least one aperture (104a, 104b).

8. The sensor assembly (10) of claim 7, wherein the at least one boss (102a, 102b) is fully insertable into the at least one aperture (104a, 104b) in only a single orientation.

9. The sensor assembly (10) of claim 7, wherein the at least one boss (102a, 102b) comprises an elongated round shape.

10. The sensor assembly (10) of claim 1 comprising:
at least one boss (102c) defined by each of the first manifold (90) and the second manifold (92); and
at least one mating aperture (104c) defined by the support block (100) having a size and dimension to engage the at least one boss (102c), wherein the size and dimension of the at least one boss (102c) is keyed to the at least one aperture (104c).

11. The sensor assembly (10) of claim 10, wherein the at least one boss (102c) is fully insertable into the at least one aperture (104c) in only a single orientation.

12. The sensor assembly (10) of claim 10, wherein the at least one boss (102c) comprises an elongated round shape.

13. The sensor assembly (10) of claim 1, wherein:
the flow tube (20) comprises a single-tube, dual loop flow tube, wherein an inlet bend (27) thereon is coplanar with a first flow tube loop (26) and an outlet bend (29) thereon is coplanar with a second flow tube loop (24), and wherein:
the sensor assembly (10) comprises a channel (107) in the tube support (106) that sweeps along a path in only a single plane, and wherein the flow tube (20) is a size and dimension to engage the channel (107) in the tube support (106).

14. The sensor assembly (10) of claim 1, wherein:
the flow tube (20) comprises a single-tube, dual loop flow tube, wherein the crossover section (22) comprises a first portion proximate an outlet bend (29), the first portion being coplanar with a first flow tube loop (26), and wherein the crossover section (22) comprises a second portion proximate an inlet bend (27), the second portion being coplanar with a second flow tube loop (24); and
the sensor assembly (10) comprises a channel (107) in the tube support (106) that sweeps along a path in only a single plane.

15. The sensor assembly (10) of claim 1, wherein the thermal expansion bend (300) is located on a portion of the flow tube (20) located between one of the first manifold (90) and the second manifold (92) and a proximate anchor block (30a, 30b) to define a first apex.

16. The sensor assembly (10) of claim 15, wherein the height of the first apex is between 0.01 inches and 1 inch from a proximate non-bent portion of the flow tube (20).

17. The sensor assembly (10) of claim 1, wherein the thermal expansion bend (302) is located on a portion of the flow tube (20) located between the first anchor block (30a) and the second anchor block (30b) to define a second apex.

18. The sensor assembly (10) of claim 17, wherein the height of the second apex is between 0.01 inches and 1 inch from a proximate non-bent portion of the flow tube (20).

19. The sensor assembly (10) of claim 1, comprising an offset bend (402) in a crossover section (22) of the flow tube (20).

20. The sensor assembly (10) of claim 13, wherein the channel (107) in the tube support (106) comprises a channel (107) wherein an intrados of the flow tube (20) engages the tube support (106) only at the outermost edges (E1, E2) to define a gap (G1) between the flow tube (20) and the tube support (106) that is between 0.0025 and 0.0035 inches and an extrados of the flow tube (20) engages the tube support (106) between the outermost edges (E1, E2) to define a gap at the outermost edges (E1, E2).

* * * * *